United States Patent [19]
Speich et al.

[11] 3,830,253
[45] Aug. 20, 1974

[54] COMPRESSOR VALVE APPARATUS

[75] Inventors: Carl F. Speich, La Crescent, Minn.;
Jerome C. Roach, La Crosse, Wis.

[73] Assignee: The Trane Company, La Crosse, Wis.

[22] Filed: Feb. 12, 1973

[21] Appl. No.: 332,050

[52] U.S. Cl......... 137/525, 137/516.15, 137/516.21, 417/564
[51] Int. Cl.............................................. F16k 15/14
[58] Field of Search.......... 137/514, 516.15, 516.23, 137/525, 525.3; 417/479, 550, 563, 564, 566; 188/282, 317

[56] References Cited
UNITED STATES PATENTS

| | | |
|---|---|---|
| 1,107,284 | 8/1914 | Gardner........................ 137/516.15 |
| 2,249,480 | 7/1941 | Leegard.......................... 137/516.21 |
| 2,948,461 | 8/1960 | Frank................................... 417/564 |

FOREIGN PATENTS OR APPLICATIONS

| | | |
|---|---|---|
| 537,057 | 12/1955 | Italy................................ 137/516.21 |
| 676,820 | 3/1939 | Germany........................ 137/516.21 |

*Primary Examiner*—William R. Cline
*Assistant Examiner*—George L. Walton

[57] ABSTRACT

A refrigeration compressor is shown having a thin annular resilient intake valve which has no support ears and which is restrained within a valve cage having a valve stop surface conforming to a cylinder to limit maximum stress and thereby enhance reliability.

10 Claims, 5 Drawing Figures

PATENTED AUG 20 1974    3,830,253

COMPRESSOR VALVE APPARATUS

BACKGROUND OF THE INVENTION

Refrigeration compressor valves are generally of one of two types. The first type involves the use of a substantially rigid plate which functions as the valve port closure member and is biased toward the valve seat through the use of a variety of well known spring means. Annular valves of this type are often referred to in the industry as a spring-loaded ring plate valve. These valves have rapid but controlled seating resulting from their normal rotation. However, these valves have the disadvantage of being stable only in a relatively narrow range of mass flow rates.

A second type of valve is made of relatively thin material which is caused to flex as the valve moves between its open and closed positions. Such valves are resilient in character and for this reason do not necessarily require a separate biasing means as do ring plate valves. Throughout this specification and the claims the words "flexing" and "resilient" as used to describe a valve are intended to mean a valve which by its deformation moves between its open and closed positions. Such flexing valves may be annular in form and thus appropriately called flexing or resilient ring valves. These flexing valves may be supported at their center through a spoke structure or they may be restrained in their movement by a plurality of stops which contact with circumferentially spaced tabs or ears on the outer edge of the valve. These valves remain stable in operation throughout a wider range of mass flow rates, particularly at the lower mass flow rates. Many advances have been made toward improving the reliability of such flexing valves such as through new designs and the use of selected materials and surface finishing techniques.

SUMMARY OF THE INVENTION

The instant invention pertains to flexing or resilient ring valves and more particularly to a design which combines the advantages of both ring plate and resilient ring valves. We have discovered that by eliminating the tabs, ears and spokes from flexing ring valves it permits rapid but controlled seating with stable valve operation over a wider range of mass flow rates than would be possible with prior valves. This has been possible through the use of a novel valve supporting structure.

This valve supporting structure comprises a valve cage which has surfaces disposed at the outer edge of the valve for restraining the valve against lateral translation and further has a valve stop surface to limit the movement of the valve in a direction away from the valve seat. The resilient valve is not restrained against rotation. This valve stop surface contacts the valve substantially throughout an annular area. This annular area of the valve stop is cylindrical in contour for the reason that we have found that this substantially reduces valve breakage.

Thus it is the primary object of this invention to provide the means by which the reliability of a flexing or resilient valve may be increased.

And it is a further object of this invention to provide a resilient valve apparatus which is rapid to seat.

Specifically, this invention involves a compressor apparatus involving in combination a thin resilient annular valve; a valve seat disposed in face-to-face abutting relationship with one side of said valve in its fully closed position; a valve stop having a curved substantially cylindrical surface disposed to abut in face-to-face relation the other side of said valve in its fully open position substantially throughout a substantially annular area.

DESCRIPTION OF THE DRAWINGS

Other objects and advantages will become apparent as this specification proceeds to describe the invention with reference to the drawing in which.

DETAILED DESCRIPTION

Figure 1:
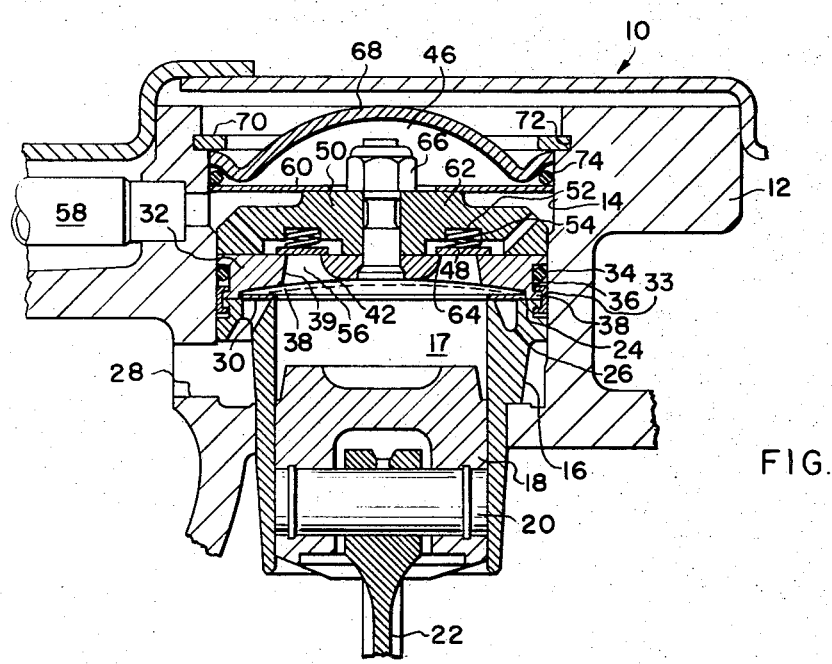
FIG. 1 is a vertical section of a refrigerant compressor incorporating the inventive valve structure.

Now with reference to the drawing it will be seen that compressor 10 has a main body 12 which has a bore 14 for receiving a compression cylinder 16. A piston 18 is slidably mounted within the cylinder 16 and arranged to be reciprocated by way of wrist pin 20 and connecting rod 22 in the conventional manner by a crankshaft not shown.

Figure 5:
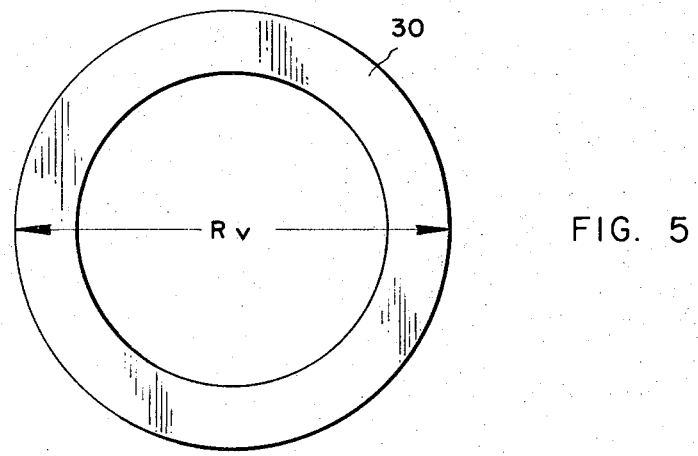
FIG. 5 is an enlarged view of the upper face or side of the suction valve shown in FIG. 1.

Cylinder 16 terminates at its upper end in the form of a suction valve seat 24 in which is provided an open annular groove 26 which communicates with a supply of suction gas through an opening 28 in the main body. Annular groove 26 is open at the top and communicates with the space within the cylinder 16 above piston 18 whereby suction gas may be drawn into said cylinder during the downward stroke of piston 18. To terminate this communication during the upward or compression stroke of piston 18, a thin annular resilient valve 30 is disposed over groove 26 on valve seat 24. Valve 30 is flat while in its closed position and prevents the flow of gas from cylinder 16 outward through groove 26. Valve 30 has no tabs or ears at its periphery as will be seen in FIG. 5 and is sufficiently thin to deflect between its open and closed positions. Both the inner and outer edges of valve 30 are concentric circles.

Valve 30 is restrained in its position adjacent valve seat 24 by an annular valve cage 32 disposed within bore 14. An O-ring seal 34 within a peripheral groove 36 of valve cage 32 prevents leakage of gas at the outer edge of valve cage 32. The bottom side of valve cage 32 abuts against the upper rim of cylinder 16 outwardly of valve seat 24 thereof for holding cylinder in place within bore 14. Valve cage 32 and cylinder 16 are fastened together through the use of a rolled clamping ring 33. The bottom side of valve cage 32 has a circular depression 38 for receiving valve 30. Depression 38 has a circular cylindrical sidewall 40 circumscribing the outer rim or edge of valve 30. Sidewall 40 is concentric with the cylinder 16 and is spaced outwardly of valve 30 by about one thousandths of an inch or less to thereby prevent any substantial lateral translation of valve 30. Depression 38 has an end wall 42 which intersects with cylindrical sidewall 40 adjacent points 44 at a depth of only several thousandths of an inch greater than the thickness of valves 30. This clearance and the aforementioned clearance at the outer edge of valve 30 prevent valve 30 from binding in its travel between the fully open and fully closed positions. This clearance is also necessary to permit the valve to rotate about its axis during operation. The precise mechanism which causes the valve to rotate is not fully understood. However, it should be understood that any slight continuous pressure such as by a valve mounting clamp will prevent such rotation. A large circular aperture 39 extends from the end wall 42 of depression 38 upwardly to the upper surface of valve cage 32 for egress of discharge gas from the compression chamber 17 formed by cylinder 16, piston 18 and valve cage 32.

Figure 2:
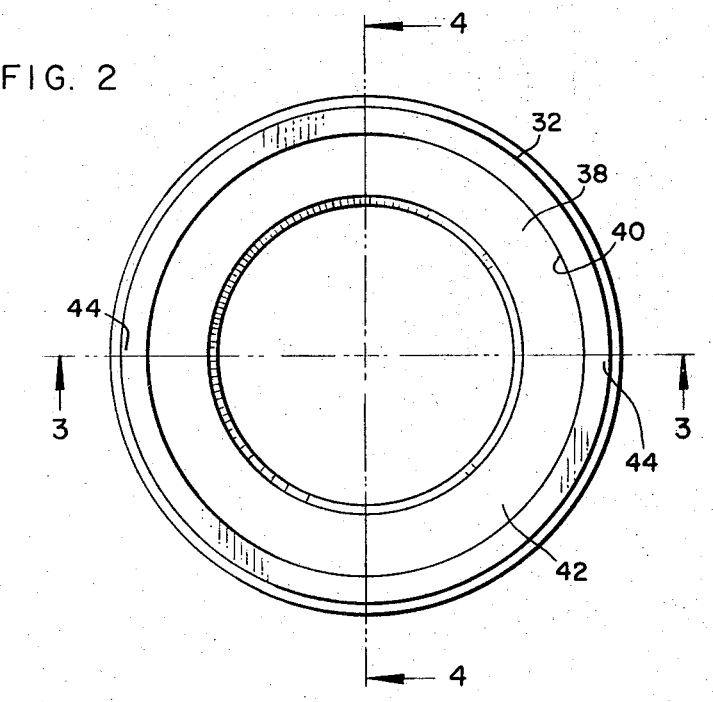
FIG. 2 is an enlarged bottom view of the suction valve cage and backstop.
Figure 3:
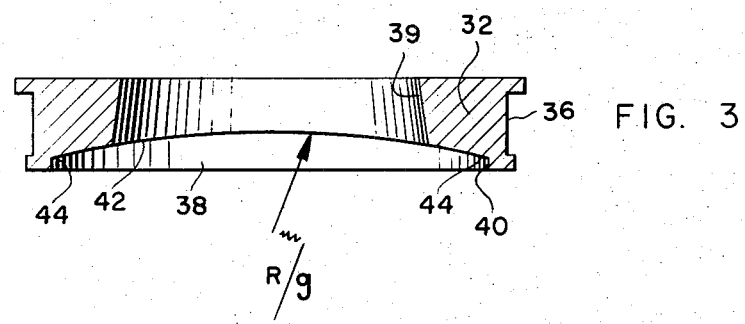
FIG. 3 is a section taken at line 3—3 of FIG. 2.
Figure 4:
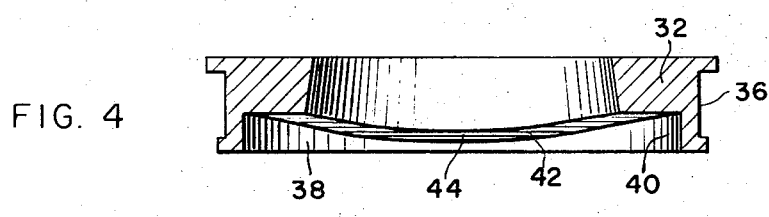
FIG. 4 is a section taken at line 4—4 of FIG. 2.

Thus the end wall of depression 38 is an annular surface, as will be seen in FIG. 2 which directly overlies annular valve 30. It will be further seen in FIGS. 1 and 3 that the annular surface 42 conforms to the contour of a right circular cylinder having a radius $R_g$ of between 9 to 20 times the outer radius $R_v$ of valve 30. The axis of the right circular cylinder is normal to the axis of cylinder 16 (i.e. parallel to the plane of valve seat 24 or the bottom side of valve cage 32) and is on the same side of the surface 42 as is valve 30.

Thus it will be seen that as valve 30 is moved from its closed position (shown in full line in FIG. 1) by the passage of suction gas from inlet groove 26, it first contacts the surface 42 at two points 44. These areas of contact between valve 30 and surface 42 grow outwardly from points 44 toward each other. When valve 30 has reached the full open position (as shown in dashed line in FIG. 1) the valve assumes the cylindrical contour of surface 42 and the area of contact between surface 42 and valve 30 is annular. It has been found that by limiting the movement of valve 30 in this manner by the contoured surface 42 while providing the aforementioned clearances for valve 30, substantial reduction in valve breakage may be achieved.

As the piston 18 ascends and the gases are compressed, the pressure in the compression chamber 17 becomes greater than the pressure in the discharge chamber 46 and discharge plate ring valve 48 in the discharge valve cage 50 is forced upward against the action of the compression springs 52, retained in circular slot 54 of the discharge valve cage 50, and the compressed gas flows through the discharge ports 56 into discharge chamber 46. The compressed discharge gas from discharge chamber 46 exits through conduit 58.

The resilient retainer member 60, commonly called a Belville spring, engages shoulders 62 of discharge valve cage 50 to hold the discharge valve cage securely against the suction valve cage 32. A discharge valve seat 64 is secured to the discharge valve cage 50 by a nut 66. The resilient retainer member 60, upon a surge or slug of liquid into the suction side of the cylinder 16, will allow the discharge valve cage 50 to move upwards and thereby prevent destruction or serious injury to the compressor. Retainer member 60 is held within bore 14 by a cylinder head 68 which in turn is held within bore 14 by a retainer ring 70 disposed within a groove 72 of bore 14. An O-ring seal 74 at the periphery of cylinder head 68 prevents leakage of discharge gas around the cylinder head.

Although we have described in detail the preferred embodiment of our invention, it is contemplated that many changes may be made without departing from the scope or spirit of our invention and we desire to be limited only by the claims.

We claim:

1. Compressor apparatus including in combination a thin resilient annular valve; a valve seat disposed in face-to-face abutting relationship with one side of said valve in its fully closed position; a valve stop having a curved substantially cylindrical concave surface disposed to abut in face-to-face relation the other side of said valve in its fully open position substantially throughout a substantially annular area.

2. The apparatus as defined by claim 1 wherein said surface conforms substantially to a right circular cylinder.

3. The apparatus as defined by claim 2 wherein said annular valve is circular and said right circular cylinder has a radius between 9 and 20 times the outer radius of said valve.

4. Compressor apparatus including in combination a thin resilient annular valve; an annular valve seat adjacent one face of said valve; means for rotatably positioning said valve in face-to-face relationship with said valve seat; said valve positioning means including a valve stop means having a fixed curved surface disposed in face-to-face relationship with the other face of said valve for abutting said other face of said valve along an inflection free curved face of said valve in the fully open position, said fixed curved surface being deflection free in at least one plane.

5. The apparatus as defined by claim 4 wherein said curved surface is substantially cylindrical.

6. The apparatus as defined by claim 5 wherein said curved surface is concave.

7. The apparatus as defined by claim 4, wherein said curved surface conforms substantially to a right circular cylinder.

8. The apparatus as defined by claim 7 wherein said annular valve is circular and said right circular cylinder has a radius between 9 and 20 times the outer radius of said valve.

9. The apparatus as defined by claim 4 wherein said valve stop means includes means adjacent the outer edge of said valve for restraining said valve against substantially lateral movement parallel to the plane of said valve seat.

10. The apparatus as defined by claim 9 wherein the outer edge of said valve is substantially circular and in abutting relationship with said last named means.

* * * * *